3,677,803
ANTISEIZE THREAD COMPOSITION
Frank W. Bennett and Loren S. Van Delinder, Charleston, W. Va., assignors to Union Carbide Corporation, New York, N.Y.
No Drawing. Original application Aug. 30, 1968, Ser. No. 756,355. Divided and this application Mar. 5, 1971, Ser. No. 121,534
Int. Cl. B44d 5/00, 5/08
U.S. Cl. 117—94        11 Claims

ABSTRACT OF THE DISCLOSURE

An antiseize composition comprising finely divided pulverized chrysotile asbestos and a carrier therefor. There is also provided a process for treating metallic securing assemblies of the type wherein a metallic securing member such as a stainless steel bolt threadably engages a fastening element such as a stainless steel nut to prevent seizure of the fastening element to the securing member at the site of threadable engagement which comprises applying the novel antiseize material to the portions to be in threadable engagement.

---

This application is a division of application Ser. No. 756,355, filed Aug. 30, 1968, now abandoned.

The present invention relates to a process for treating metallic securing assemblies of the type wherein a metallic securing member threadably engages a fastening element and more particularly to a process for treating bolts to prevent seizure of the bolts to the nut in threadable engagement therewith.

Securing assemblies fabricated from metals such as steel and/or stainless steel bolts and nuts, threaded rods and the like are currently widely employed in many commercial and industrial applications. Their wide acceptance is based primarily on the relative strength provided by such metals, particularly steel and stainless steel assemblies, and also their resistance to many chemical reactions. However, these securing assemblies, for example, steel bolts when used at high temperatures, tend to weld to the nut with which it is in threadable engagement so that either the threads are damaged during disassembly or complete seizure occurs requiring that the bolts be twisted or cut off. When employing austenitic stainless steel bolts, the problem is even more pronounced in that seizure of the nut to the bolt can occur by galling when the steel bolt and nut assembly is made at ambient temperature. In order to alleviate this problem, it has been the custom to apply a lubricant or anti-seize compound to the threaded portion of the securing member prior to engaging the securing member with the nut or other fastening element. The commonly employed lubricants or anti-seize compositions include greases, oils, metallic compounds and graphite. Unfortunately, however, some of the above-mentioned materials are not entirely satisfactory for use at elevated temperatures and those which are suitable are relatively expensive and add to the cost of fabrication.

We have discovered an antiseize material, that is, a material which prevents seizure and/or galling of the fastening element to the securing member which material is inexpensive, easy to apply and which maintains its property under severe conditions of elevated temperatures over extended periods of time.

It is, therefore, an object of the present invention to provide a new antiseize material.

Another object is to provide a process for treating metallic securing assemblies, of the type wherein a metallic securing member threadably engages a fastening element, to prevent seizure of the fastening element to the securing member.

A further object is to provide a process for treating threaded steel members prior to engaging the nut or other fastening element thereto to prevent seizing of the nut to the threaded steel member. These and other objects will be apparent from the following description.

The antiseize material of the present invention is a chrysotile asbestos, preferably a chrysotile asbestos which has been comminuted into a fine powder and a carrier therefor, and which has been treated to remove gangue materials and other impurities. As is known, chrysotile asbestos generally occurs in mineral deposits in the form of closely packed fibers. The process of separating the fibers from the asbestos ore in which they occur generally comprises a series of crushing and winnowing operations whereby the fibrous rock is subjected to mechanical pressure and shock, and during these operations the fiber is carried away by air currents and the associated rock is discarded.

For some commercial operations where the purity of the product is not of substantial significance, the above procedure for producing a chrysotile asbestos has been found to be generally satisfactory. In many important commercial operations, as well as in the present invention, however, it is preferred that the asbestos material have a high degree of purity, that is, that the final product contain little or no gangue or other impurities, and moreover, that the fiber bundles be separated into individual fibrils from each other.

Several techniques have been proposed to chemically disperse the asbestos fibrils and thus obtain more complete separation of individual fibrils from each other and from gangue and other impurities. Such chemical dispersion techniques are described in U.S. Pats. 1,907,616; 2,661,287; 2,626,213 and 3,062,701, for example.

A particularly suitable and preferred procedure for preparing asbestos dispersions is described in U.S. Pat. 3,297,-516. Generally, the process described therein comprises contacting an aqueous slurry of chrysotile asbestos with a metal aluminate such as potassium aluminate, calcium aluminate or barium aluminate. To the slurry is added a monobasic acid, such as, acetic acid, formic acid, hydrochloric acid, or nitrous acid until the pH of the resulting aqueous slurry is from about 4.0 to about 6.0. As a result there is formed a highly charged, strongly adsorbable, polymolecular colloid of material consisting of aluminum hydroxide or hydrated aluminum oxides. The slurry is thereafter subjected to high speed shearing forces to provide asbestos dispersions which are useful as a source of finely divided asbestos. Purification, i.e. separation of gangue and other impurities can thereafter be easily effected by known gravity methods.

The chrysotile asbestos antiseize material can be applied to the threaded portion of the securing element in any convenient form such as in the form of powders, dispersions, suspensions and the like. A particularly convenient procedure is to utilize the chrysotile asbestos in the form of a paste containing the chrysotile asbestos in finely divided, pulverized form. Thus, when employing the above-mentioned prior art procedures for preparing dispersions of the asbestos material, the aqueous dispersion can be filtered thereby forming a "cake" of the asbestos material. A liquid carrier, such as a paraffinic oil preferably mineral oil, alkyl glycols, water and the like can then be added to form a paste-like consistency to the mass. In general, the chrysotile asbestos comprises from about 10 to about 60 percent by weight of the weight of the composition, preferably 15 to 30 percent by weight. Thus the carrier can comprise 40 to 90% and preferably 85 to 70% carrier.

In some cases the presence of alkali and/or chloride contaminants in the asbestos can have a detrimental effect on the material to be serviced. For example, the presence of significant quantities of chloride in the asbestos could cause stress-corrosion cracking of austenitic stainless steels and the presence of alkali can have a detrimental affect on iron fasteners. For this reason, it is preferred that these contaminants be removed from the asbestos. A convenient and effective procedure for removing alkali and chloride from asbestos involves diluting the asbestos so as to obtain above 2% solids by weight asbestos in distilled water or deionized water. In this manner, the contaminants diffuse from the surface of the asbestos into the bulk water. Thereafter the bulk water is separated from asbestos by a conventional filtration procedure.

The securing assemblies to which the present invention is directed are those which normally are effected by changes in temperature, pressure, time and other variables which cause "seizing" of the assembly, e.g. the seizing of the nut to a bolt.

Merely as illustrative, the antiseize material can be effectively employed in connection with securing assemblies fabricated from iron, steel, stainless steel, nickel-base alloys, cobalt-base alloys and complex super-strength stainless steel alloys and the like.

The method for applying the chrysotile asbestos material to the securing assembly can be varied and depends in part on the form in which the asbestos is to be applied. Where the chrysotile asbestos is the sole essential material i.e. without a carrier, such as finely pulverized chrysotile material in powder form, then a convenient procedure for application is to spray the asbestos material into the threaded portion of the securing member. However, this procedure is not preferred because of the lack of adherence of the asbestos material to the securing member. This disadvantage can be minimized however by first coating the threaded member with an adhesive prior to application of the chrysotile asbestos.

When the chrysotile asbestos is employed in the form of a paste, the material to be serviced can be immersed in the paste to the extent of the threaded portion or alternatively the paste can be applied by rubbing the paste onto the surface of the threaded portion of the securing member. It will, of course, be understood that the antiseize material can also be applied to the threaded portion of the fastening element in lieu of the above or in addition to the above that a variety of techniques can be employed for this purpose.

The invention will be more fully understood by reference to the following specific examples. These examples are merely illustrative of the practice of this invention and are not intended to limit the invention in any manner other than as defined in the appended claims.

EXAMPLE 1

The chrysotile asbestos employed in this example was in the form of a heavy paste containing high-purity, resin-grade, short fiber white asbestos sold by the Mining & Metals Division of Union Carbide Corporation. The paste contained 19.3% chrysotile asbestos and 80.7% mineral oil.

In this example, the antiseize composition was tested in connection with one-half inch diameter by two-inch long, hex-head, coarse-thread, machine bolts of type 304 stainless steel. Two nuts and two flat washers of the type 304 stainless steel were placed on the threaded portion of each bolt. The antiseize material was applied by hand to the threads of the bolt, and a nut was screwed on the bolt. The threads were again recoated, the washers were coated individually and placed on the bolt and the second nut thereafter screwed on the bolt. The nuts were thereafter tightened onto the bolt with a torque wrench having a dial indicator reading of zero to ±600 in.-lbs. (50 ft.-lbs.) and were preloaded to 30 ft.-lbs. or 360 in.-lbs. torque preload. The nuts were loosened and a measurement taken as to the amount of breaking torque required to loosen the nuts. The nuts were again tightened to 360 in.-lbs. preload a second time and again loosened. The nuts were tightened to 360 in.-lbs. torque preload a third time and thereafter exposed to a temperature of 1200° F. for 793 hours and the breaking torque after exposure was again measured. The results are indicated in Table I.

EXAMPLE 2

The procedure of Example 1 was repeated and the results indicated in Table I.

EXAMPLES 3 AND 4

The procedure of Example 1 was repeated, except that the antiseize material was pulverized chrysotile asbestos which was present in an amount of 27.1% in water and the tests were conducted on two stainless steel bolts.

The results of the foregoing Examples are indicated in Table I and are compared with a control in which no antiseize material was employed.

TABLE I.—STAINLESS STEEL BOLT ANTISEIZE TESTS AT 1,200° F. FOR 793 HOURS

[½" dia. type 304 bolts with 2 nuts and 2 flat washers, lubricant in threads and between washers (30 ft.-lbs. or 360 in.-lbs. torque preload)]

| Example No. | Antiseize material | Breaking torque immediately after preloading | | Breaking torque after exposure | Condition of material and bolt after exposure |
|---|---|---|---|---|---|
| | | 1st preload | 2nd preload | | |
| 1 | 19.3% fluffy asbestos in mineral oil. | 310 | 360 | 425 | Front nuts finger-loose after breaking, back nuts fairly loose. No galling. Soft, fluffy white coating, very good lubricating "feel." |
| 2 | Same as Example 1 | 370 | 390 | 400 | Same as Example 1. |
| 3 | 27.1% pulverized asbestos in water. | 360 | 410 | 300 | Same as Examples 1 and 2 except better distribution and retention of coating in threads. |
| 4 | Same as Example 3 | 380 | 430 | 325 | Same as Example 3. |
| Control | None | 290 | 300 | >600 | Galling occurred. |

What is claimed is:

1. A method of treating metallic securing assemblies of the type wherein a metallic securing member threadably engages a fastening element to prevent seizure of the fastening element to the securing member at the site of threadable engagement which comprises applying to the portion of the securing member to be threadably engaged with said fastening element a chrysotile asbestos.

2. A method according to claim 1 wherein said chrysotile asbestos is applied in the form of a paste comprising 15 to 30% chrysotile asbestos and 85 to 70° of a carrier therefor.

3. A method according to claim 1 wherein said chrysotile asbestos is applied in the form of a paste comprising 10 to 60% chrysotile asbestos and 40 to 90% of a carrier therefor.

4. A method according to the claim 2 wherein said carrier is water.

5. A method according to claim 2 wherein said carrier is an alkyl glycol.

6. A method according to claim 1 wherein said securing assembly is fabricated from stainless steel.

7. A method according to claim 1 wherein said metallic securing member is a steel bolt and wherein said fastening element is a stainless steel nut.

8. A method according to claim 2 wherein said chrysotile asbestos is a finely divided, pulverized chrysotile asbestos.

9. A metallic securing assembly comprising a securing member in threadable engagement with a fastening element and a chrysotile asbestos disposed at the site of said threadable engagement.

10. A metallic securing assembly according to claim 9 wherein said securing member and fastening element is fabricated from stainless steel.

11. A metallic securing assembly according to claim 10 wherein said securing member is a bolt and said fastening element is a nut.

References Cited

UNITED STATES PATENTS

| | | | |
|---|---|---|---|
| 2,419,252 | 4/1947 | Bychinsky et al. | 117—127 X |
| 3,061,455 | 10/1962 | Anthony | 117—127 X |

EDWARD G. WHITBY, Primary Examiner

U.S. Cl. X.R.

85—1 C; 117—121, 135.1, 169 R; 252—14, 28